United States Patent
Lango et al.

(10) Patent No.: US 7,155,531 B1
(45) Date of Patent: *Dec. 26, 2006

(54) STORAGE METHODS AND APPARATUS FOR STREAMING MEDIA DATA

(75) Inventors: Jason Lango, Mountain View, CA (US); Konstantinos Roussos, Sunnyvale, CA (US); Robert Lieh-Yuan Tsai, Atlanta, GA (US); Christopher J. Wagner, Langley, WA (US)

(73) Assignee: Network Appliance Inc., Sunnyvale, CA (US)

( * ) Notice: Subject to any disclaimer, the term of this patent is extended or adjusted under 35 U.S.C. 154(b) by 723 days.

This patent is subject to a terminal disclaimer.

(21) Appl. No.: 09/981,678

(22) Filed: Oct. 16, 2001

Related U.S. Application Data (60) Provisional application No. 60/297,943, filed on Jun. 12, 2001.

(51) Int. Cl.
  *G06F 15/16* (2006.01)
(52) U.S. Cl. ............... 709/231; 709/216; 709/219; 709/223; 709/230; 709/231; 711/100; 711/113; 711/117; 711/118; 711/130; 725/87; 725/92
(58) Field of Classification Search ........... 711/130, 711/133, 159, 100, 113, 117, 118, 147; 709/231, 709/235, 230, 216, 219, 223; 707/1–5; 719/216, 719/219; 725/87, 92
See application file for complete search history.

(56) References Cited

U.S. PATENT DOCUMENTS

| | | | |
|---|---|---|---|
| 5,043,885 A | 8/1991 | Robinson | |
| 5,414,455 A * | 5/1995 | Hooper et al. | 725/88 |
| 5,422,674 A * | 6/1995 | Hooper et al. | 375/240.15 |
| 5,586,264 A | 12/1996 | Belknap et al. | |
| 5,615,362 A | 3/1997 | Jensen et al. | |
| 5,671,225 A * | 9/1997 | Hooper et al. | 370/468 |
| 5,737,747 A | 4/1998 | Vishlitzky et al. | |
| 5,799,185 A | 8/1998 | Watanabe | |
| 5,854,887 A | 12/1998 | Kindell et al. | |
| 5,884,298 A * | 3/1999 | Smith et al. | 707/2 |
| 5,918,020 A | 6/1999 | Blackard et al. | |
| 5,953,506 A * | 9/1999 | Kalra et al. | 709/231 |
| 5,960,452 A | 9/1999 | Chi | |
| 6,061,504 A | 5/2000 | Tzelnic et al. | 709/219 |
| 6,085,193 A | 7/2000 | Malkin et al. | |
| 6,098,096 A * | 8/2000 | Tsirigotis et al. | 709/213 |
| 6,134,559 A | 10/2000 | Brumme et al. | |
| 6,311,215 B1 * | 10/2001 | Bakshi et al. | 709/221 |
| 6,351,471 B1 | 2/2002 | Robinett et al. | |
| 6,351,474 B1 | 2/2002 | Robinett et al. | |

(Continued)

OTHER PUBLICATIONS

NetCache™ 5.1 Web Cache First-Time Configuration Guide, Network Appliance, Inc., Sunnyvale, California, Apr. 2001.

(Continued)

*Primary Examiner*—Saleh Najjar
*Assistant Examiner*—Shawki Ismail
(74) *Attorney, Agent, or Firm*—Blakely Sokoloff Taylor & Zafman LLP (57) ABSTRACT

A cache memory configured to store media data to be output as a media stream includes a session data file configured to store properties of the media stream, wherein the properties may include encoding scheme, duration, and others, and a plurality of data object files, each data object file individually and directly accessible by a file system, each data object file comprising a data object configured to store only a portion of the media data.

19 Claims, 7 Drawing Sheets

U.S. PATENT DOCUMENTS

| | | |
|---|---|---|
| 6,366,970 B1 | 4/2002 | Wolff et al. |
| 6,407,680 B1 | 6/2002 | Lai et al. |
| 6,421,733 B1 * | 7/2002 | Tso et al. .................... 709/246 |
| 6,463,508 B1 * | 10/2002 | Wolf et al. ................. 711/133 |
| 6,484,212 B1 * | 11/2002 | Markowitz et al. ......... 709/246 |
| 6,505,169 B1 | 1/2003 | Bhagavath et al. |
| 6,516,361 B1 * | 2/2003 | Lym et al. .................... 710/56 |
| 6,593,860 B1 * | 7/2003 | Lai et al. ....................... 341/50 |
| 6,594,751 B1 | 7/2003 | Leivent |
| 6,629,153 B1 | 9/2003 | Gupta et al. |
| 6,697,819 B1 | 2/2004 | Boudreau |
| 6,708,213 B1 | 3/2004 | Bommaiah et al. |
| 6,721,850 B1 | 4/2004 | Hofmann et al. |
| 6,742,082 B1 | 5/2004 | Lango et al. |
| 6,744,763 B1 | 6/2004 | Jones et al. |
| 6,748,481 B1 * | 6/2004 | Parry et al. ................. 711/100 |
| 6,813,690 B1 | 11/2004 | Lango et al. |
| 6,891,694 B1 | 5/2005 | Hetzler et al. |
| 7,073,028 B1 * | 7/2006 | Lango et al. ............... 711/118 |
| 7,076,560 B1 * | 7/2006 | Lango et al. ............... 709/231 |
| 2001/0003193 A1 | 6/2001 | Woodring et al. |
| 2001/0034786 A1 | 10/2001 | Baumeister et al. |
| 2002/0029282 A1 | 3/2002 | Buddhikot et al. |
| 2002/0056126 A1 | 5/2002 | Srikantan et al. |
| 2002/0097750 A1 | 7/2002 | Gunaseelan et al. |
| 2002/0116473 A1 | 8/2002 | Gemmell |
| 2002/0116585 A1 | 8/2002 | Scherr |
| 2002/0162047 A1 * | 10/2002 | Peters et al. .................... 714/5 |
| 2002/0169926 A1 | 11/2002 | Pinckyney, III et al. |
| 2002/0181506 A1 | 12/2002 | Loguinov |
| 2003/0217113 A1 | 11/2003 | Katz et al. |
| 2004/0039837 A1 | 2/2004 | Gupta et al. |
| 2004/0177063 A1 * | 9/2004 | Weber et al. ................... 707/3 |
| 2004/0249965 A1 * | 12/2004 | Huggins et al. ............ 709/231 |
| 2004/0267954 A1 * | 12/2004 | Shen ........................... 709/231 |
| 2005/0015509 A1 * | 1/2005 | Sitaraman ................... 709/231 |
| 2005/0055425 A1 | 3/2005 | Lango et al. |
| 2005/0066063 A1 * | 3/2005 | Grigorovitch et al. ......... 710/1 |
| 2005/0071496 A1 * | 3/2005 | Singal et al. ............... 709/232 |
| 2005/0165828 A1 | 7/2005 | Lango et al. |
| 2006/0053253 A1 * | 3/2006 | Roth et al. .................. 711/118 |
| 2006/0064500 A1 * | 3/2006 | Roth et al. .................. 709/231 |

OTHER PUBLICATIONS

NetCache™ 5.1 Routine Administration Guide, Network Appliance, Inc., Sunnyvale, California, Apr. 2001.

NetCache™ 5.1 Configuration Guide, Network Appliance, Inc., Sunnyvale, California, Apr. 2001.

NetCache™ 5.1 Deployment Planning Guide, Network Appliance, Inc., Sunnyvale, California, Apr. 2001.

NetCache™ 5.1 Features and Configuration Planning Guide, Network Appliance, Inc., Sunnyvale, California, Apr. 2001.

NetCache™ 5.1 Streaming Media Cache First-Time Configuration Guide, Network Appliance, Inc., Sunnyvale, California, Apr. 2001.

NetCache™ 5.1 Accelerator First-Time Configuration Guide, Network Appliance, Inc., Sunnyvale, California, Apr. 2001.

Dictionary Entry for "object-oriented database", Microsoft Computer Dictionary, Fifth Edition, Microsoft Press, 2002 p. 373.

* cited by examiner

DATA FORMAT HIERARCHY

STORAGE METHODS AND APPARATUS FOR STREAMING MEDIA DATA

CROSS-REFERENCE TO RELATED APPLICATIONS

The present invention disclosure claims priority to Provisional U.S. Patent Application No. 60/297,943, filed Jun. 12, 2001, entitled Streaming Media Payload Storage Method and Apparatus. This application is herein by incorporated by reference for all purposes. Co-pending U.S. patent application Ser. No. 09/981,668, titled Caching Media Data Using Content-Sensitive Identifiers, filed Oct. 16, 2001, is also incorporated by reference for all purposes.

BACKGROUND OF THE INVENTION

The present invention relates to data caching. More particularly, the present invention relates to apparatus for caching streaming media and to methods of operation of streaming media caches.

Typical file caching methods include a cache receiving a file from a file server, and storing the entire file. Later, when a client desires the file, instead of serving the file from the file server, the file is served from the cache. Because the cache is typically a server that is closer to the client or has higher bandwidth than the file server, the file is served to the client quickly from the cache.

It has been discovered by the inventors, that attempting to apply typical file caching methods to files that include streaming media data, raises many new problems. For instance, serving a streaming media data file from a cache requires much more processing by the cache than with classical file transfers over the web. For example, during normal playback, the cache may need to perform a lot of processing such as packet modification, resequencing, and retiming. As another example, the cache may be called upon to perform random access within the streaming media data file as a result of a client "rewind" or "fast forward" operation. Because, classical caching is typically file-based, such a random access would involve moving within a very large data file.

Another drawback is that since streaming media data files are very large, a huge penalty is incurred if the streaming media data file is deleted. Typically if a file cache determines that it needs more disk space for new files, it will first delete older files, regardless of the size. As an example, if an older file is a streaming media data file that stores an hour-long program, the entire hour-long program is deleted even if the cache only needs to free up the equivalent of 1 minute of space.

Another drawback is that many different streaming media formats exist, each with its own specific streaming requirements. This is in contrast to classical file transfer over the web, where the files are essentially opaque to the cache and for streaming data to clients, the cache does not need to process the actual contents of the file beyond storage and retrieval.

Thus what is required are improved methods and apparatus for storing and serving streaming media within a cache. Further, what is required are methods and apparatus for providing such solutions in economical ways.

BRIEF SUMMARY OF THE INVENTION

The present invention relates to streaming media caches and methods of operation. More particularly, the present invention relates to efficient retrieval of streaming media data by receiving streaming media data, then storing the data in a format that can be efficiently streamed to client systems.

In the present disclosure "Streaming media" data generally refers to media intended to be transported at a select (often, subscribed) bit rate, and with a desired timeliness. The streaming media is adapted for playback in a desired order without regard to the order the streaming media data are received by a client system. Streaming media generally conforms to a real-time delivery protocol, such as, e.g., RTSP, RTP, or the like. The media (media clip) represented in the streaming media data may include static images, video data, audio data, executable files, presentation data, applet data, data files, and the like.

The data that is cached in a streaming media cache may be an entire streaming media clip, portions of a streaming media clip, or the like. In the case where there is a streaming media cache hit, the portion of the streaming media stored in the streaming media cache is served to a client. In the case of a streaming media cache miss, the missing portion of a streaming media clip may be retrieved from a media server, instead of an entire streaming media clip. The missing portion of the streaming media clip that is retrieved from an upstream or origin server is then stored and then served to a client. Storing a streaming media clip in the efficient method described below allows the streaming media cache to maintain portions of a streaming media clip that are often requested, and to flush portions of the streaming media clip that are not often requested.

According to one aspect of the invention, a cache memory configured to store media data to be output as a media stream is described. In one apparatus, the cache memory includes session data configured to store properties of the media stream, wherein the properties may include encoding scheme, duration, and others. Additionally, the cache memory may also include a plurality of data object, each data object individually and directly accessible by a file system, each data object comprising a data object configured to store a portion of the media data.

According to another aspect of the invention, a method for storing in a cache memory media data to be output as streaming media is described. In one technique, the method includes storing a first plurality of data objects in the cache memory, the first plurality of data objects configured to store a first plurality of data associated with a first encoding of the media data, wherein each data object of the first plurality of data objects is directly addressable in the cache memory via an associated object handle, and wherein each data object of the first plurality of data objects is configured to store a portion of data from the first plurality of data. Techniques may also include the step of storing a second plurality of data objects in the cache memory, the second plurality of data objects configured to store a second plurality of data associated with a second encoding of the media data, wherein each data object of the second plurality of data objects is directly addressable in the cache memory via an associated object handle, and wherein each data object of the second plurality of data objects is configured to store a portion of data from the second plurality of data.

According to another aspect of the invention, a computer program product for a computer system including a processor and a memory is described. The computer program product may include executable code that directs the processor to store a first plurality of data associated with an encoding of a first source media in a first plurality of data objects in the memory, wherein each data object of the first plurality of data objects is directly addressable in the memory by the processor via an associated object filename, and wherein each data object of the first plurality of data objects is configured to store a portion of data from the first plurality of data. The computer program product may also include executable code that directs the processor to store a second plurality of data associated with an encoding of a second source media in a second plurality of data objects in the memory, wherein each data object of the second plurality of data objects is directly addressable in the memory by the processor via an associated object filename, and wherein each data object of the second plurality of data objects is configured to store a portion of data from the second plurality of data. The codes typically reside on a tangible media such as a hard disk, removable disk, and the like.

According to yet another aspect of the invention, a cache memory configured to store streaming media data are disclosed. The cache memory may include executable code that directs a processor to receive streaming media data from a streaming media server, the streaming media data comprising a series of packets of media data, the packets of media data including header data and payload data, and executable code that directs the processor to separate the header data from payload data. Additionally, the cache memory may include a session data file storing a portion of the header data, wherein the header data are selected from the group: encoding scheme, duration, and a plurality of data objects storing the payload data, wherein each data object of the first plurality of data objects is directly addressable in the cache memory via an associated object handle, and wherein each data object of the first plurality of data objects stores a portion of the payload data.

DETAILED DESCRIPTION OF THE INVENTION

Figure 1A:
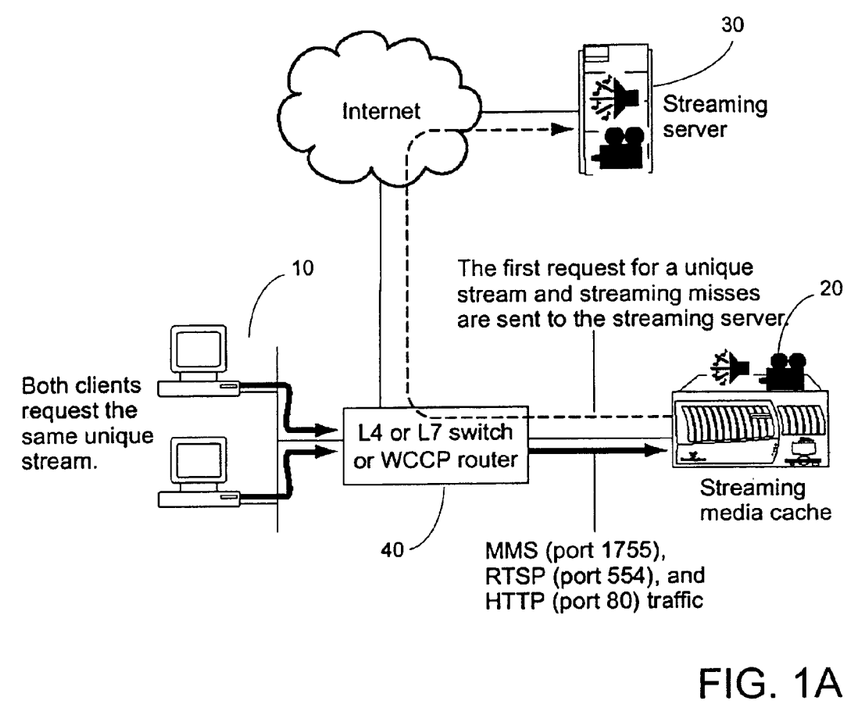
FIGS. 1A–B illustrate overview diagrams according to embodiments of the present invention.

FIG. 1A illustrates a overview diagram according to an embodiment of the present invention. In particular, FIG. 1A includes a client system 10, a streaming media cache (server) 20, media data server 30 (streaming server), and a router 40. The elements of FIG. 1A are coupled as disclosed over computer networks such as a local area network, wide area networks (Internet), wireless networks or the like.

In one embodiment, client system 10 initially makes a request for a stream of streaming media. The media (media clip) may include static images, video data, audio data, executable files, and the like. This request may take the form of a user clicking upon a URL on a web page, or the like. In this embodiment, this request is intercepted by router 40. Router 40 may be embodied as a layer 4 or layer 7 switch, a Web Cache Coordination Protocol (WCCP) router, or any other conventional switch or router. In such embodiments, router 40 would be configured to recognize when a request is made by client system 10 for a stream of streaming media.

If such a request is determined by router 40, that request is redirected to streaming media cache 20, and not media data server 30. Once streaming media cache 20 receives the request, it makes a determination whether the stream (the entire media clip) or the requested portion of the stream (the request portion of the media clip) has already been cached. If the data has been previously stored, streaming media cache 20 provides the streaming media to client system 10.

In the present embodiment, if the data (requested portion of a stream) has not previously been stored in streaming media cache 20, streaming media cache 20 sends a request to media server 30 for a stream of data including the requested portion of a stream. As the requested portion of the stream of data are delivered to streaming media cache 20, it is forwarded to client system 10, and the portion of the stream of data are stored.

For this embodiment, the streaming media traffic is received by media cache 20 from specific ports. In specific embodiments, for RealNetworks RealSystem streaming media, media cache 20 receives streaming media via TCP on port 554; for QuickTime (RTSP) streaming media, media cache 20 receives streaming media via TCP on port 554 and/or via UDP on port 2001; for Microsoft Media Streaming (MMS) streaming media, media cache 20 receives streaming media data via TCP on port 1755; and for HTTP streaming media, media cache 20 receives streaming media data via TCP on port 80, or the like. In other embodiments, other ports for the streaming media may also be used.

Figure 1B:
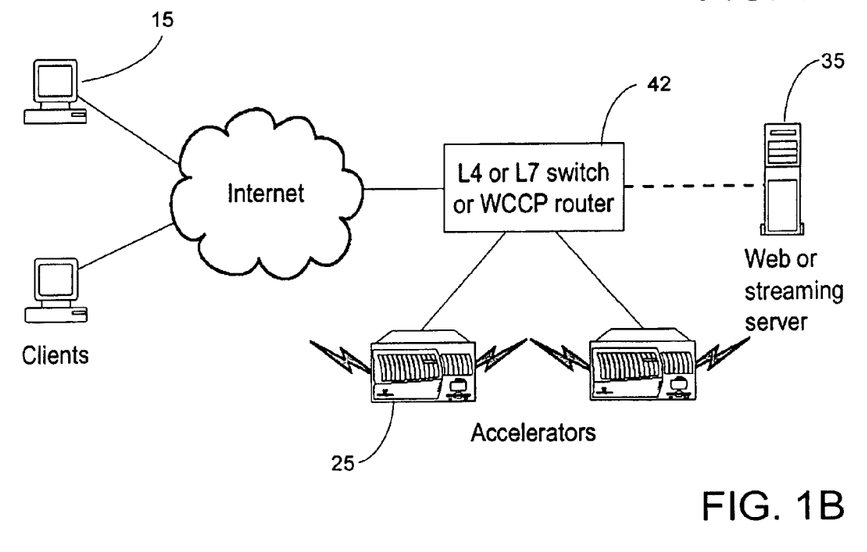

The embodiment illustrated above is configured to be accessible from client system 10 via a local area network. It should be understood that streaming media cache 20 may be alternatively positioned at other points in the network, for example, at the edge of a point of presence network on the Internet, and the like. An example is illustrated in FIG. 1B FIG. 1B illustrates a overview diagram according to another embodiment of the present invention. In particular, FIG. 1B includes a client system 15, a streaming media cache (server) 25, media data server 35 (streaming server), and a router 42. The elements of FIG. 1B are coupled as disclosed over computer networks such as a local area network, wide area networks (Internet), wireless networks or the like. In this embodiment, streaming media cache 25 may be embodied as an accelerator on the edge of a point of presence (POP).

In this embodiment, client system 15 initially makes a request for a stream of streaming media (representing a streaming media clip). This request may take the form of a user clicking upon a URL on a web page, or the like. In this embodiment, the request is passed over the wide area network and is intercepted by router 42. Router 42 may be embodied as a layer 4 or layer 7 switch, a WCCP router, or any other conventional switch or router. In this embodiments, router 42 would be configured to recognize when a request is made by client system 10 for a stream of streaming media.

If such a request is determined by router 42, that request is redirected to streaming media cache 25, and not media data server 35. Once streaming media cache 25 receives the request, it makes a determination whether the streaming media clip or the requested portion of the streaming media clip has already been cached. If the data has been previously stored, streaming media cache 25 provides the streaming media to client system 10.

In the present embodiment, if the data has is not stored in streaming media cache 25, streaming media cache 25 sends a request to media server 35 for the missing data. As the stream of data (including the portion of the streaming media clip) is delivered to streaming media cache 25, it is forwarded to client system 15. The missing portion of the streaming media clip is then stored in streaming media cache 25. Details of the storage format and the process of storing and retrieving the stream of data are described in greater detail below.

For this embodiment, the streaming media traffic is sent by media cache 20 to specific ports. In specific embodiments, for RealSystem streaming media, media cache 20 sends streaming media via TCP on port 554; for QuickTime (RTSP) streaming media, media cache 20 sends streaming media via TCP on port 554 and/or via UDP on port 2001; for Microsoft Media Streaming (MMS) streaming media, media cache 20 sends streaming media data via TCP on port 1755; and for HTTP streaming media, media cache 20 sends streaming media data via TCP on port 80, or the like. In other embodiments, other ports for the streaming media may also be used.

In other embodiments of the present invention, one or more streaming media caches may be positioned simultaneously at the illustrated locations between client system 15 and media server 35. Additional streaming media caches may also be positioned at other locations between client system 15 and media server 35, for example at a user ISP, on an intranet, and the like. In light of this disclosure, it will be apparent that many other network configurations can incorporate embodiments of the present invention.

Figure 2:
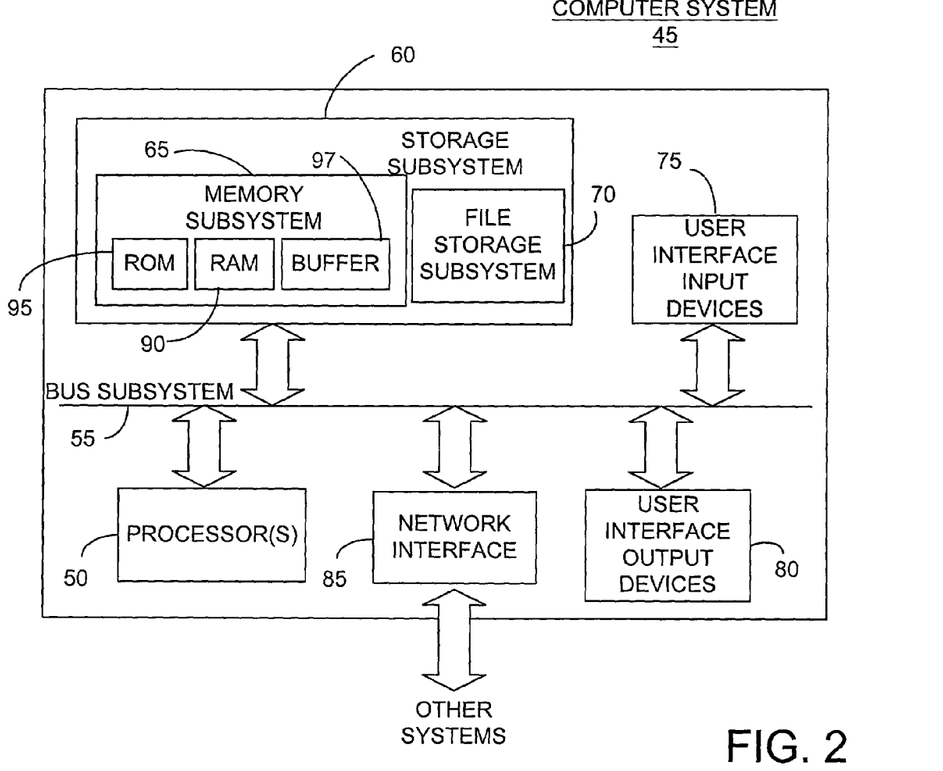
FIG. 2 is a simplified block diagram of a computer system according to an embodiment of the present invention.

FIG. 2 is a simplified block diagram of a computer system 45 according to an embodiment of the present invention. Computer system 45 may be used as client system 10, streaming media cache 20, and/or media data server system 30. Computer system 45 may be a stand-alone computer system, a computer "appliance," or the like.

As shown in FIG. 2, computer system 45 includes at least one processor 50, which communicates with a number of peripheral devices via a bus subsystem 55. These peripheral devices may include a storage subsystem 60, comprising a memory subsystem 65 and a file storage subsystem 70 user interface input devices 75, user interface output devices 80, and a network interface subsystem 85. The input and output devices allow user interaction with computer system 45. A user may be a human user, a device, a process, another computer, and the like.

Network interface subsystem 85 provides an interface to other computer systems. Embodiments of network interface subsystem 85 include an Ethernet card, a modem (telephone, satellite, cable, ISDN), (asynchronous) digital subscriber line (DSL) units, and the like. Network interface 250 is coupled to a typical network as shown.

User interface input devices 75 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information using computer system 50.

User interface output devices 80 may include a display subsystem, a printer, a fax machine, or non-visual displays such as audio output devices. The display subsystem may be a cathode ray tube (CRT), a flat-panel device such as a liquid crystal display (LCD), or a projection device. The display subsystem may also provide non-visual display such as via audio output devices. In general, use of the term "output device" is intended to include all possible types of devices and ways to output information from computer system 45.

Storage subsystem 60 may be configured to store the basic programming and data constructs that provide the functionality of the computer system and of the present invention. For example, according to an embodiment of the present invention, software modules implementing the functionality of the present invention may be stored in storage subsystem 60. These software modules may be executed by processor (s) 50 of computer system 45. In a distributed environment, the software modules may be stored on a plurality of computer systems and executed by processors of the plurality of computer systems. Storage subsystem 60 may also provide a repository for storing various databases that may be used to store information according to the teachings of the present invention. For example, a cache entry hash table, discussed below, may be stored in storage subsystem 60 of media server 30. Storage subsystem may also function as a cache of streaming media cache 20. Storage subsystem 60 may comprise memory subsystem 65 and file storage subsystem 70.

Memory subsystem 65 may include a number of memories including a main random access memory (RAM) 90 for storage of instructions and data during program execution and a read only memory (ROM) 95 in which fixed instructions are stored. RAM 90 is typically also used for execution of programs, storage of data, and the like.

File storage subsystem 70 provides persistent (non-volatile) storage for program and data files, and may include a hard disk drive, a floppy disk drive along with associated removable media, a Compact Digital Read Only Memory (CD-ROM) drive, an optical drive, removable media cartridges, and other like storage media. One or more of the drives may be located at remote locations on other connected computers.

A memory buffer 97 is also provided in storage subsystem 60. In this embodiment, memory buffer 97 is a special buffer memory coupled to file storage subsystem 70. More specifically, memory buffer 97 provides a temporary storage area for data retrieved from and data sent to file storage subsystem 70. Memory buffer 97 may also provide a temporary storage area for data received from a streaming media server (or other upstream server) and for data to be sent to client systems. As will be discussed below, the type of data may include streaming media payload data.

In the present embodiment, computer system 45 typically also includes software that enables it to send and receive data and communications to and from client systems 10 and media data server 30 using communications protocols including, HTTP, S-HTTP, TCP/IP, UDP, SSL, RTP/RTSP and the like. In alternative embodiments of the present invention, other software and transfer and communication protocols may also be used, for example IPX, UDP or the like.

Bus subsystem 55 provides a mechanism for letting the various components and subsystems of computer system 45 communicate with each other as intended. The various subsystems and components of computer system 45 need not be at the same physical location but may be distributed at various locations within a network. Although bus subsystem 55 is shown schematically as a single bus, alternative embodiments of the bus subsystem may utilize multiple busses.

Computer system 45 itself can be of varying types including a personal computer, a portable computer, a workstation, a computer terminal, a network computer, a mainframe, a kiosk, a personal digital assistant (PDA), a wireless communication device such as a cell phone, an entertainment console (PS2, X-box) or any other data processing system. Due to the ever-changing nature of computers and networks, the description of computer system 45 depicted in FIG. 1B is intended only as a specific example for purposes of illustrating an embodiment of the computer system.

In one embodiment, computer system 45 is embodied as a network cache (appliance) in a product called "NetCache" available from NetworkAppliance, Incorporated. The Net-Cache family of products currently includes the NetCache C1100, NetCache C3100, and NetCache C6100 including proprietary, but available hardware and software. Embodiments of the present invention may also be implemented in future additions to the NetCache family of products.

It will be readily apparent to one of ordinary skill in the art that many other hardware and software configurations are suitable for use with the present invention. For example, other types of processors are contemplated, such as the Athlon™ class microprocessors from AMD, the Pentium™-class or Celeron™-class microprocessors from Intel Corporation, PowerPC™ G3 or G4 microprocessors from Motorola, Inc., Crusoe™ processors from Transmeta, Inc. and the like. Further, other types of operating systems are contemplated in alternative embodiments including WindowsNT™ from Microsoft, Solaris from Sun Microsystems, LINUX, UNIX, MAC OS X from Apple Computer Corporation, BeOS™, and the like. Many other configurations of a computer system are possible having more or fewer components than the computer system depicted in FIG. 1B.

Figure 3:
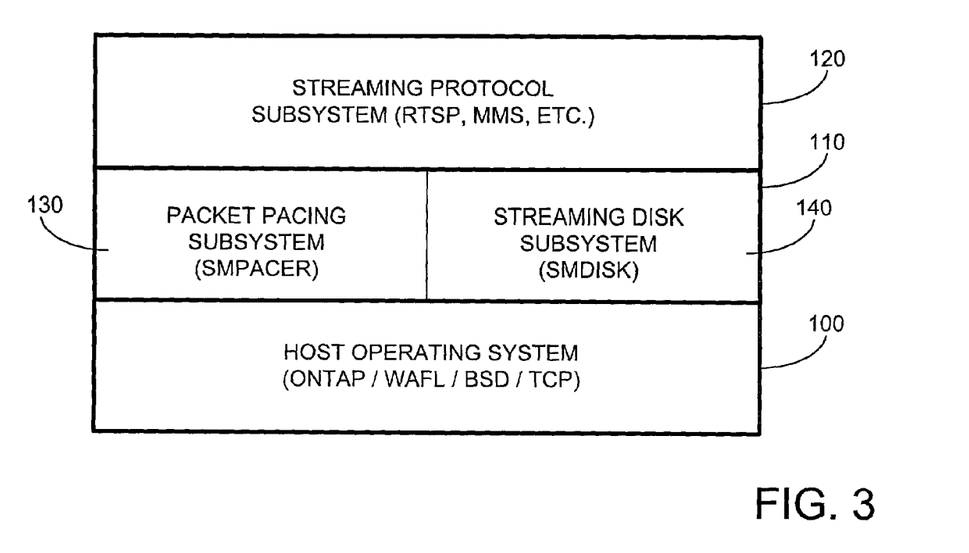
FIG. 3 illustrates a software hierarchy according to embodiments of the present invention.

FIG. 3 illustrates a software hierarchy according to embodiments of the present invention. In particular, FIG. 3 includes a three-tiered hierarchy including an operating system level (layer) 100, a data handling level (layer) 110, and a protocol level (layer) 120.

In the present embodiment, as illustrated, operating system level (layer) 100 includes portions of the Berkeley Software Distribution (BSD) operating system. Additionally, operating system level 100 includes software provided by the assignee of the present invention: Data ONTAP™, a Network Appliance brand operating system with Write Anywhere File Layout (WAFL™), a Network Appliance brand file system. In the present embodiment, the Data ONTAP™ operating system provides efficient file service by using file-system technology and a microkernel design geared towards network data access. The WAFL™ file system provides efficient file storage and retrieval based upon efficient access algorithms and data structures. Additionally, network communications using Transmission Control Protocol (TCP) and UDP are also supported at operating system level 100. Of course other types of operating systems can also be used.

As illustrated in FIG. 3, data handling level (layer) 110 includes a packet pacing subsystem (SMPACER) 130 and a streaming disk subsystem (SMDISK) 140. In the present embodiment, streaming disk subsystem 140 is used to retrieve data packets from the file system and to provide the data to SMPACER 130. As will be described below, in one embodiment, SMDISK 140 receives streaming media data packets and in turn SMDISK 140 creates a series of specialized data objects for storing the data. Further, SMDISK 140 receives the specialized data objects from the file system and stores the data packets into a buffer for output as streaming media.

In this embodiment, SMPACER 130 receives data packets (meta-data and payload data) via a pointer to a buffer location or the like from SMDISK 140. In turn, SMPACER 130 sends the pointers to protocol level (layer) 120. As described below, protocol level 120 formats the packets according to the desired streaming protocol. The formatted streaming packets are then received by SMPACER 130. Based upon delivery times for each packet, SMPACER 130 then sends a stream of packets to the client system at the desired rate. In particular, protocol level 120 "filters" or adjusts the "delivery time" of packets to be output to clients, and the like. The adjusted meta-data and the payload data are then output by SMPACER 130 to a client, based upon the adjusted delivery time.

In this embodiment, protocol level 120 includes support for at least one, but typically for more than one streaming media protocols. The support includes encoding of data to form streams of streaming media and decoding of streams of streaming media. In one example, a streaming media protocol is the Microsoft Media Streaming (MMS) protocol. By supporting the MMS protocol, streams of MMS formatted data can be received from a streaming media (upstream or origin) server and the streamed (payload) data can be retrieved. This payload data can be sent to data handling layer 110 via SMDISK 140 for storage. Additionally, payload data determined by SMDISK 140 can be encoded into streams of MMS data. The encoded data are then sent to SMPACER 130 for paced delivery to a client system. The client system may play the encoded data via a player such as Microsoft Windows Media Player, and the like.

In another example, a streaming media protocol is the Real Time Streaming Protocol (RTSP). In addition to RTSP support, one embodiment includes Apple QuickTime format support and RealNetworks RealSystem format support. By supporting these protocols, streams of QuickTime formatted data or RealSystem data can be received from streaming media servers and the respective streaming (payload) data are retrieved. These payloads are then sent to data handling layer 110 via SMDISK 140 for storage. Additionally, payload data from SMDISK 140 can be encoded into streams of data and delivered to the client by SMPACER 130. The streaming data can be played on client systems via a QuickTime player or a RealSystem player, and the like. In other embodiments, other types of streaming media encoding schemes may be supported.

The above hierarchy has been described in embodiments as being implemented via software. However, it should be understood that some functions may be implemented in hardware or firmware. Accordingly, additional embodiments of the above may be implemented via hardware, firmware, software, and combinations thereof. Further description of SMPACER 130 will be given below.

FIGS. 4A–D illustrate a data format hierarchy according to an embodiment of the present invention. In particular, FIGS. 4A–D illustrate an internal storage structure/format used by embodiments for storing data that will be streamed to client systems.

An example of a streaming media cache implementing a data storage structure described below is a NetCache™ streaming media cache. NetCache™ (latest version 5.2) includes a combination of hardware and software available from the assignee of the present patent application. Embodiments of the present invention may stream data to client systems in a variety of streaming media protocols, including Microsoft Media Streaming (MMS) protocol used by Windows Media Player™; Real Time Streaming Protocol (RTSP) used by Quicktime™ from Apple Corporation and RealSystem™ from RealNetworks; and the like.

Figure 4A:
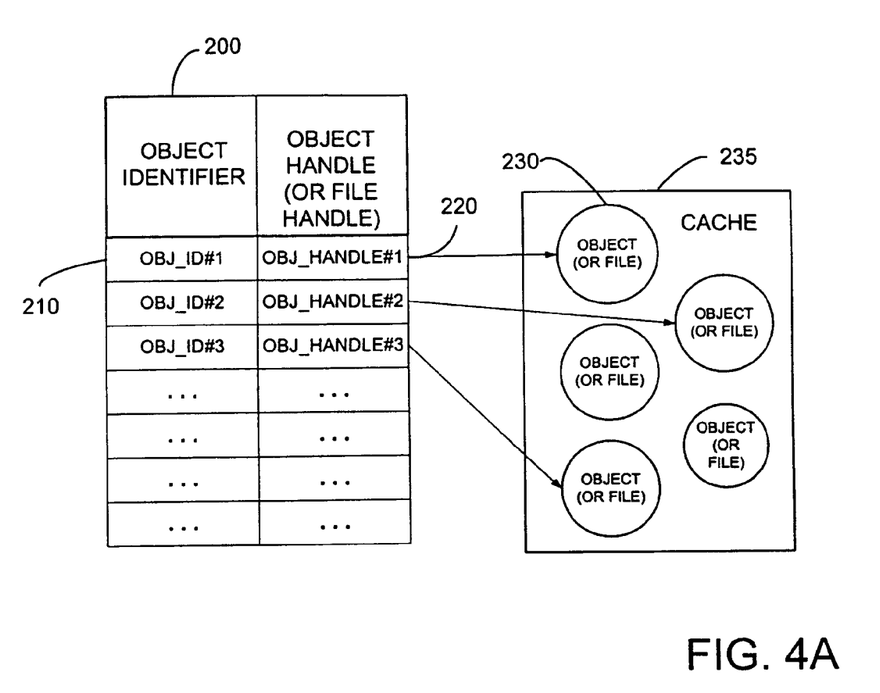
FIGS. 4A–D illustrate a data format hierarchy according to an embodiment of the present invention.

As illustrated in FIG. 4A, the present embodiment includes a cache entry table hash table 200 and a plurality of entries wherein each entry includes an object identifier 210. In one embodiment, object identifiers are file names that have been hashed. Further details regarding this aspect of the invention are disclosed in the co-pending application cited above. Cache entry table 200 typically also includes a plurality of object handles 220 for a particular object. In the present embodiment, object handles 220 may be a reference or pointer to an object 230 corresponding to the object identifier and stored in a cache 235.

In the present embodiment, object handles 220 may be used to retrieve the corresponding object 230 from cache 235. According to an embodiment of the present invention, objects 230 are stored as separate data files in cache 235. In this embodiment, each object handle 220 corresponds to a file handle and the object itself is stored as a file. Accordingly, the individual files are each independently accessible in cache 235 by a file system.

Figure 4B:
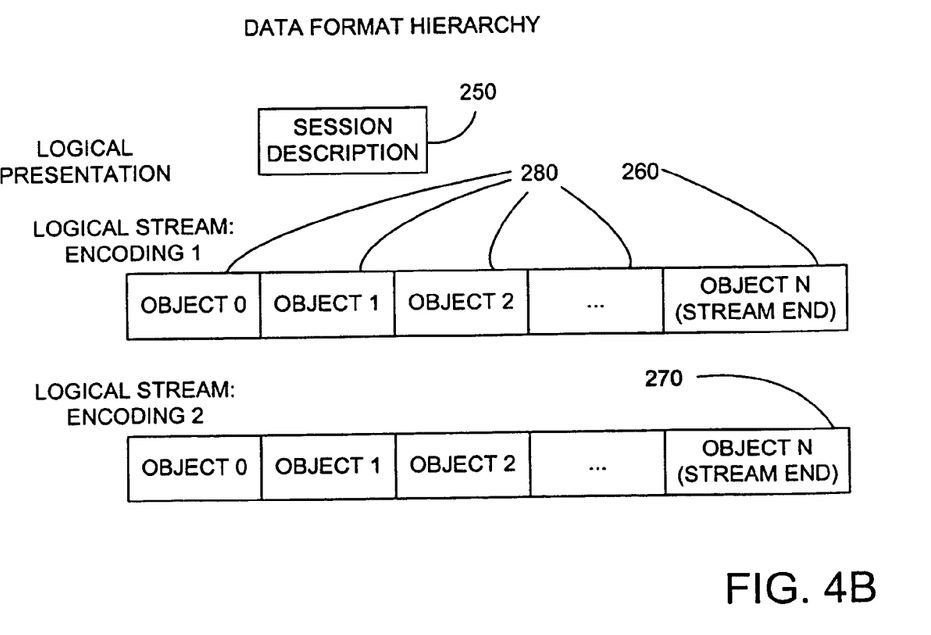

FIG. 4B illustrates a session description 250 (stored in a session data file or session data object) and logical streams of data 260 and 270 according to an embodiment. Logical stream 260 represents data for streaming media encoded in a first encoding scheme and logical stream 270 represents data for streaming media encoded in a second encoding scheme.

In the present embodiment, each of the encodings of the data are considered separate streams of data and are stored separately. This is in contrast to cases where multiple encodings of a data stream are packaged and stored within a single data file. An example of the latter is used by RealNetworks. In particular, a data file used by RealSystem may include an encoding of data destined for 56 Kbps clients, and an encoding of data destined for 384 Kbps clients. In the present embodiment, the encoding of data destined for different bit rate clients would be stored separately. For example, a 56 Kbps encoding would be stored in logical stream 260 and a 384 Kbps encoding would be stored in logical stream 270. Other typical types of parameters that may be varied for different encodings may include the bit rate, the content (e.g. abridged, unabridged), the media type (audio and/or video), thinning parameters (frame dropping), and the like.

In FIG. 4B, session description (stored in a session data object or session data file) 250 may include a description of the various streams of data stored in logical streams 260 and 270. The description may include an enumeration of the various encoding schemes (e.g. 56 Kbps, 128 Kbps, ISDN), copyright and authoring data, presentation or play-time (duration) of the stream, version data, and the like.

As an example, a sample session description for RTSP is as follows. In particular, it illustrates extrinsic properties of the media file (author, title, copyright), as well as intrinsic properties of the media file (number of media tracks, length of media file, encoding bitrate, MIME type, and codec of each media track, etc.). All of this data together serves to help uniquely identify a particular version of the URL used to access the streaming media file.

v=0
   o=−983139433 983139433 IN IP4 172.30.200.154
   s=G2 Video Experience
   i=RealNetworks ©1998
   t=0 0
   a=SdpplinVersion:1610642970
   a=Flags:integer;2
   a—IsRealDataType:integer;1
   a=StreamCount:integer;2
   a=Title:buffer;
     "RzIgVmlkZW8gRXhwZXJpZW5jZQA="
   a=Copyright:buffer;"qTE5OTgA"
   a=Author:buffer;"UmVhbE51dHdvcmtzAA=="
   . . .
   a=range:npt=0–0
   m=audio 0 RTP/AVP 101
   b=AS:6
   a=control:streamid=0
   a=range:npt=0–59.773000
   a=length:npt=59.773000
   a=rtpmap:101 x-pn-realaudio
   a=mimetype:string;"audio/x-pn-realaudio"
   a=MinimumSwitchOverlap:integer;200
   a=StartTime:integer;0
   a=AvgBitRate:integer;6000
   a=EndOneRuleEndAll:integer;1
   a=AvgPacketSize:integer;288
   a=SeekGreaterOnSwitch:integer;0
   a=Preroll:integer;4608
   a—MaxPacketSize:integer;288
   a—MaxBitRate:integer;6000
   a=RMFF 1.0 Flags:buffer;"AAQAAgAAAAIAAA=="
   . . .
   a=StreamName:string;"audio/x-pn-multirate-realaudio logical stream"
   . . .
   m=video 0 RTP/AVP 101
   b=AS:50
   a=control:streamid=1
   a=range:npt=0–57.333000
   a=length:npt=57.333000
   a=rtpmap:101 x-pn-realvideo
   a=mimetype:string;"video/x-pn-realvideo"
   a=MinimumSwitchOverlap:integer;0
   a=StartTime:integer;0
   a=AvgBitRate:integer;50000
   a=EndOneRuleEndAll:integer;1
   a=AvgPacketSize:integer;538
   a=SeekGreaterOnSwitch:integer;1
   a=Preroll:integer;5707
   a=MaxPacketSize:integer;607
   a=MaxBitRate:integer;50000
   a=RMFF 1.0

Flags:buffer;"AAoAAgAAAAAAgACAAAAAgAAAA-IAAA=="
   . . .
   a=StreamName:string;"video/x-pn-multirate-realvideo logical stream"
   . . .

In the present embodiment, logical streams of data, such as logical stream 260 is made up of a series of data objects 280. As described in FIG. 4A, data objects 280 are physically separate files that are directly accessible, independent of other data objects 280, through use of cache entry hash table 200. In this embodiment, data objects 280 together store the "media payload" provided by streaming media encoded in a given encoding scheme. For example, the media payload may include the actual media data included in streaming media packets for a 56 Kbps stream, or the like. More particularly, data objects 280 store the media payload that has been converted from the format in which the origin server stores the media data into the network format for transmission to the client system and the cache. Accordingly, the data objects include data that are optimized for delivery to the client system (e.g., encapsulated in network protocol).

In the present embodiment, each data object 280 is used to store data having an associated and/or a predetermined amount of play time (duration). That is, each data object 280 is used to store media payload data that will be output as streaming data that will be played on a client system for a specific amount of time or duration. For example, in one embodiment, each data object 280 is used to store data that will be streamed to a client as 20 seconds of a music stream, video stream, or the like. In other embodiments, each data object 280 may store a media payload (data) having different duration, such as less than or equal to approximately 5 seconds, 10 seconds, 20 seconds, 30 seconds, 1 minute, or the like.

In one embodiment of the present invention, the duration of output for the media payload stored in typical data objects may be fixed for each data object among logical streams 260 and 270 (e.g. 15 seconds of a stream). However, in other embodiments, the duration of output for the media payload stored in typical data objects in logical stream 260 and data objects in logical 270 may be different. For example, for logical stream 260, the duration may be 15 seconds per data object, and for logical stream 270, the duration may be 30 seconds per data object, and the like.

In another embodiment, each data object 280 may store specific amounts of data instead of a specific duration for data. For example, each data object 280 may store a predetermined number of bytes of data, for example, less than or equal to approximately 64 Kbytes, 128 Kbytes, 512 Kbytes, 1 Mbyte, or the like. In another embodiment, each data object 280 may simply store "chapters" or logical segments of a movie or video, and the like. In one embodiment, each data object 280 stores a fixed number of data chunks, as described below.

In one embodiment of the present invention, data objects 280 store non-overlapping data, or unique portions of the media data. That is, each of the data objects 280 may be configured to store a portion of the media data that is unique to a reference (e.g., URL) in the request to locations in the origin (or upstream) server at which the media file is stored. In another embodiment, data objects 280 may store media data that overlaps or is redundant.

Figure 4C:
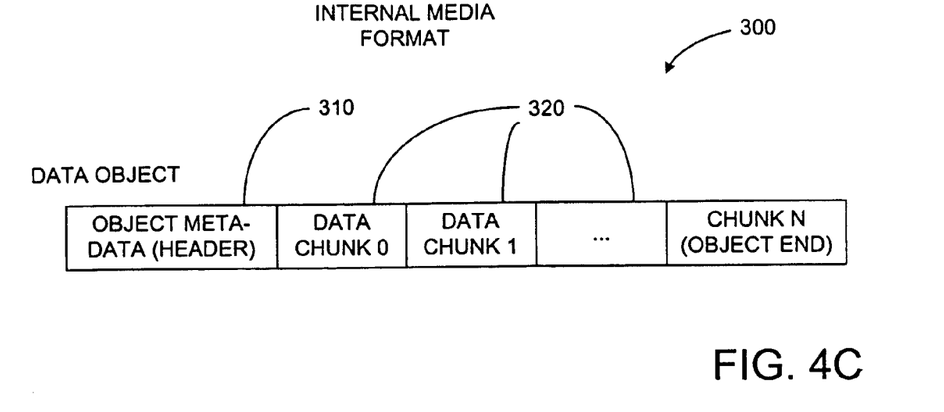

FIG. 4C illustrates a detailed description of a data object according to an embodiment of the present invention. As illustrated, FIG. 4C, a data object 300 includes object meta-data portion 310, and data chunks 320.

In this embodiment, object meta-data portion 310 is used to store data about data object 300. Such meta-data, or header data, may include file format version numbers, the number of data chunks 320 stored, the beginning presentation time and ending presentation time for data objects, and the like. In other embodiments, additional data may be stored in object meta-data portion 310 such as the data object number, protocol-specific per-data object data, a total number of bytes of payload and meta-data per data object, the number of data packets per data object, any end of stream indicators, checksum bits and the like.

In one embodiment, each data chunk 320 is also used to store data of a predetermined amount of presentation or play time (duration). That is, each data chunk 320 is used to store streaming data that will be played on a client system for a specific amount of time. For example, in one embodiment, each data chunk 320 is used to store 20 seconds of a music stream. In other embodiments, each data chunk 320 may store data having different duration, such as less than or equal to approximately 5 seconds, 10 seconds, 20 seconds, 30 seconds, 1 minute, or the like. In one embodiment of the present invention, the duration may be fixed for each data chunk 320 within data object 300. However, in other embodiments, data objects may have different durations.

In another embodiment, each data chunk 320 may store specific amounts of data. For example, each data chunk 320 may store a predetermined number of bytes of data, for example, less than or equal to approximately 32 Kbytes, 64 Kbytes, 128 Kbytes, 512 Kbytes, 1 Mbyte, or the like. In one embodiment, each data chunk has a fixed number of data packets. In still other embodiments, data chunks 320 may have a varying number of data packets.

As will be described below, in the present embodiment, each data chunk 320 is used to store the actual streaming media data. More particularly, each data chunk 320 is used to store packets of data that will be streamed to a client system.

Figure 4D:
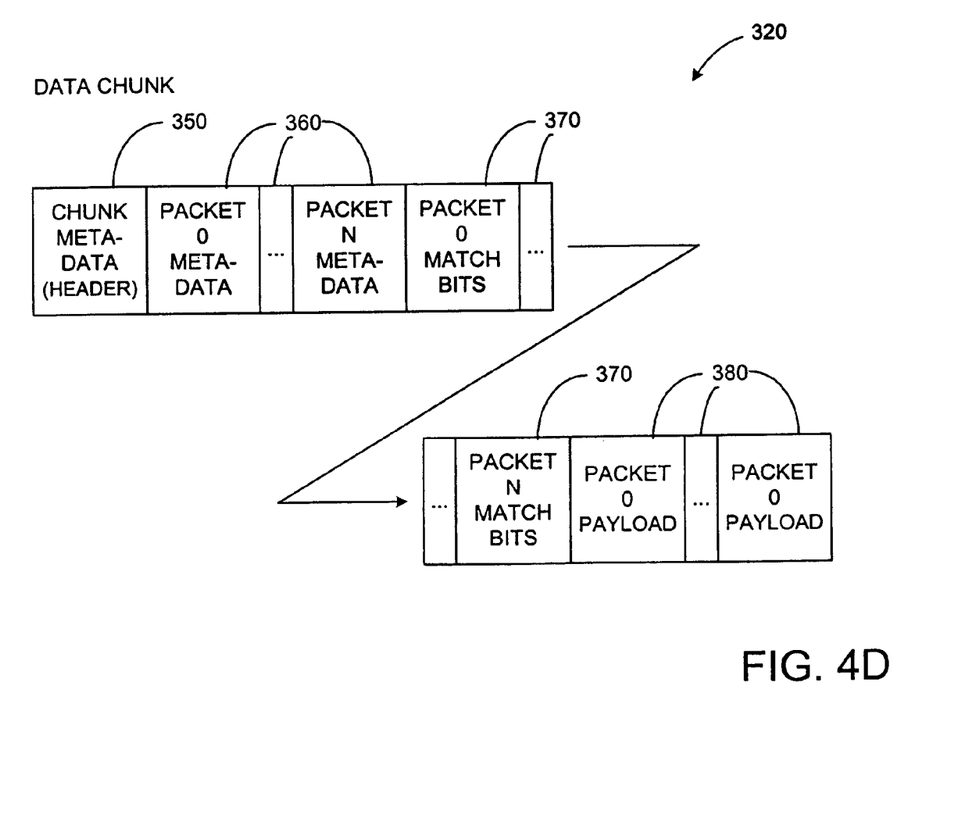

FIG. 4D illustrates a detailed description of a data chunk 320 according to an embodiment of the present invention. Each data chunk 320 includes a chunk meta-data portion 350, packet meta-data 360, packet match bits 370, and packet payloads 380.

In this embodiment, chunk meta-data portion 350 is used to store data about data chunk 320. For example, chunk meta-data portion 350 may specify the number of packet payloads (packets) 380, a file offset for a previous data chunk within the same data object, a file offset for the next data chunk within the same data object, the number of data packets in a data chunk, compressed packet meta-data for the packets, described below, and the like. In additional embodiments, the data chunk meta-data header may also include packet meta-data for all the data packets including the duration (playback duration) of the payload, the presentation time of the payload (e.g., time within a movie), the delivery time of the payload (a time SMPACER 130 delivers the payload to the client), protocol-specific data of the payload, and the like. Other types of data may be store in chunk meta-data portion 350 in other embodiments, such as timing information, and the like.

Payload packets 380 are used to store streaming data packets that make up the streaming media. For example, payload packets 380 may store audio data, image data, audiovisual data, and the like. As will be described below, the streaming data packets may be received as stream of data from a streaming media server, or may be derived from a data file received from the streaming media server. For Windows Media Player streaming media, payload packets 380 range from 200 bytes to 18 Kbytes of data, and for RealSystem streaming media and QuickTime streaming media, packet payloads 380 range from approximately 200 to 1.5 Kbytes, typically 600 bytes. The number of packet payloads in data chunk 340 typically depends upon the size of packet payloads 380.

In this embodiment, packet meta-data 360 is used to store information relevant to or associated with each payload packet 380. Types of information may include the delivery time and the presentation time, file offset of the respective payload packet 380, and the like. In the present example, the delivery time is the time SMPACER 130 should send the packet payload to the client. In contrast, the packet presentation time is the time within the media stream that the payload is displayed by the client system.

Packet match bits 370 are used in the present embodiment to store information specific to the streaming media protocol. For example, packet match bits 370 may store data such as flags to identify the start of video key-frames, such as I, B, and or P key frames, or the like. In this embodiment, packet match bits 370 are used to determine the first sendable payload (keyframe) that satisfies a seek request by the client system. In one embodiment, the match bits may be embodied as single bit, however, in other embodiments of the present invention, additional match bits may be used to represent any number of criteria, for example, for selecting which packet will be delivered first, and the like. For Windows Media Player streaming media, packet match bits 370 may be a small as a single bit, and for RealSystem streaming media and QuickTime streaming media, packet match bits 370 are approximately 32 bits.

In this embodiment, the match bits are logically grouped together and separated from the remaining packet metadata. By grouping of the match bits together, the match bits can be compressed into, for example, a single word, thereby saving memory space.

Such key frame data are useful when a client system requests to move around the stream data, for example, when jumping to a particular presentation time T within the stream. In this embodiment, based upon packet match bits 370, the key frame immediately before presentation time T is retrieved and the play-back is begun from that key frame. It has been discovered that in one embodiment, playing-back stream data from the immediately-preceding keyframe reduces the amount of media artifacts or blank time of the stream when played on the client system.

Figure 5:
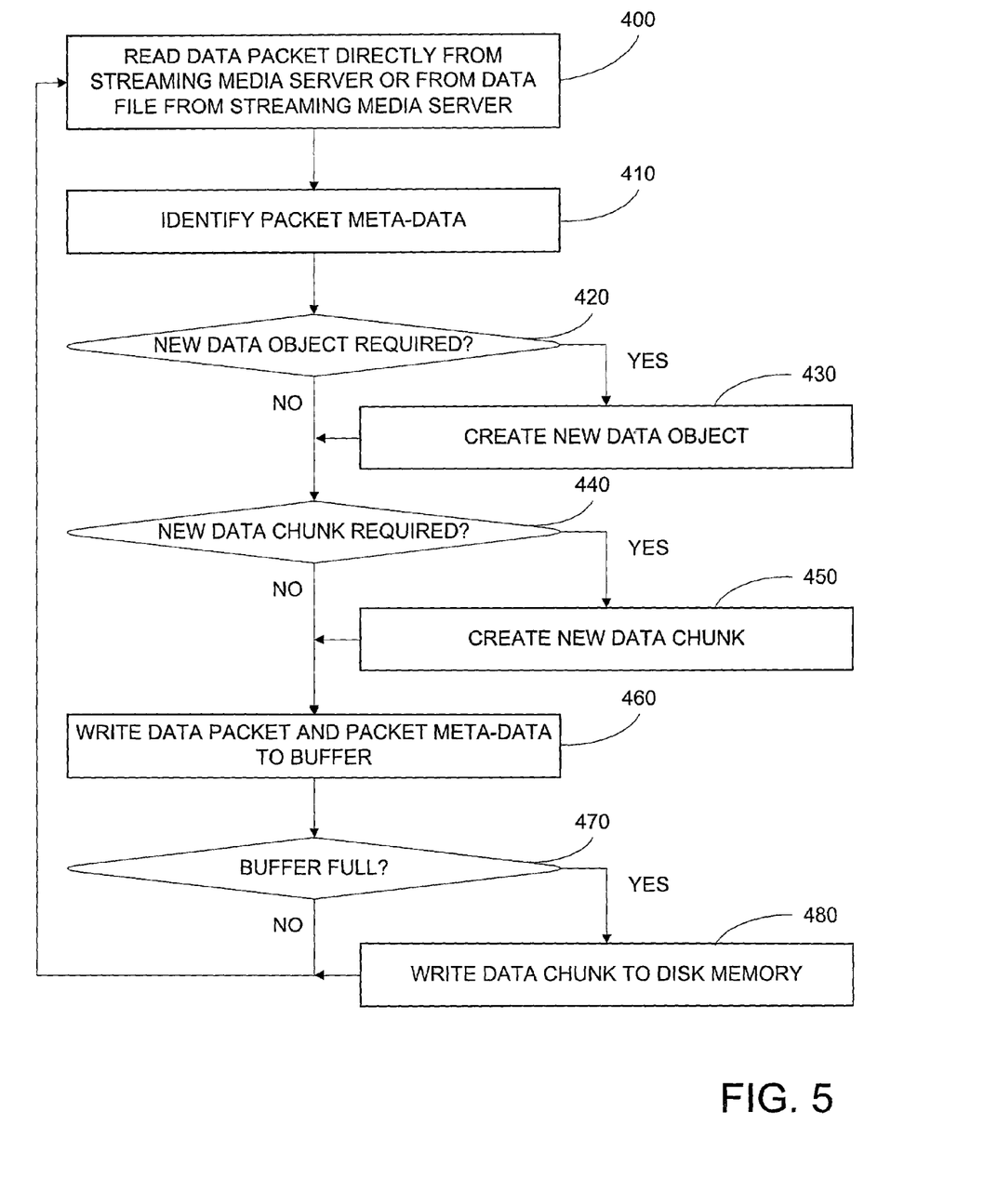
FIG. 5 illustrates a block diagram of a flow chart according to an embodiment of the present invention.

FIG. 5 illustrates a block diagram of a flow chart according to an embodiment of the present invention. More particularly, FIG. 5 illustrates a process of storing streaming media data into embodiments of the present invention. In the below embodiments, data are typically stored using the data format hierarchy illustrated in FIGS. 4A–D.

In FIG. 5, a data packet delivered from a streaming media server is received in step 400. In one embodiment, the streaming media server streams data to the streaming media cache. In such a case, a packet of data from the stream includes header data and a data packet (payload data). In another embodiment, the streaming media server sends a data file including the entire data stream to the streaming media cache. In this case, data packets and the header data are buried within the data file.

In the present embodiment, packet meta-data for a particular packet of data are then identified, step 410. In one embodiment of the present invention, the packet meta-data are derived from the header data of a particular data packet. In another embodiment, the packet is derived from the data file. The packet meta-data may include a presentation time for a data packet, an indication of a video key-frame, and the like. In this example, presentation time is the time within a media stream where the data packet is presented, for example, a data packet may have a presentation time of 20.5 seconds to 20.6 seconds representing when the data packet is output on the client system.

Next, a determination is made as to whether a new data object should be created, step 420. A new data object is typically created when a first data packet is received, or as described below a previous data object is full. In one embodiment, a new data object is created, step 430.

Next, a determination is made as to whether a new data chunk within the data object should be created, step 440. A new data chunk is typically created when a first data packet is received, or as described below, a data chunk is closed after including the previous data packet. In one case a new data chunk is created, step 450.

The data packet and the packet meta-data are then typically written to a buffer location in the streaming media cache random access memory, step 460. This buffer may be RAM 90 or buffer 97. In this embodiment, it is then determined whether the data packet is the last one for a given data chunk, step 470. If not, the process above is repeated for the next data packet.

When the data chunk is full, the chunk meta-data are determined, and the data chunk is written to random access memory (or to disk memory), step 480. In this embodiment, it is then determined whether the data chunk is the last one for a given data object, step 490. If not, the process above is repeated for the next data packet.

In this embodiment, when the data object is full, the object meta-data described above is determined, and the data object is written to disk memory, step 400. The process above may then be repeated until there are no more data packets in the media stream.

Accordingly, using the above steps, streaming media data may be received by a streaming media cache and stored in a disk memory in the object-based scheme described above. Additionally, streaming media data may be received in the form of a data file. This data file is parsed and the data are also stored in a disk memory in the object-based scheme described above.

In the above embodiment, most of the functions are performed by SMDISK 140, discussed in FIG. 3. In particular, steps 400 and 470 are typically performed at least in part by SMDISK 140; and step 480 is typically performed by a file system within operating system level 100.

Figure 6:
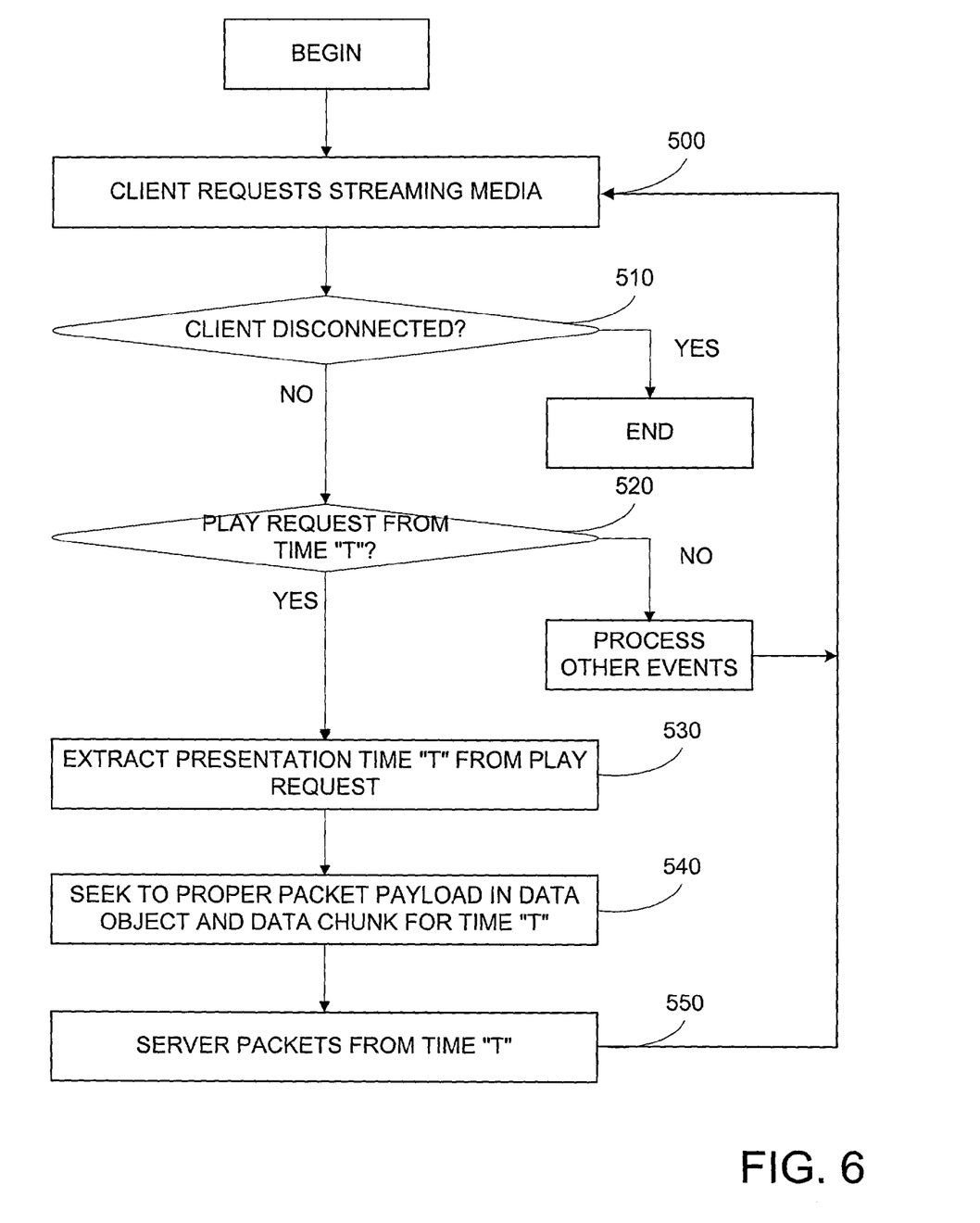
FIG. 6 illustrates a block diagram of a flowchart according to an embodiment of the present invention.

FIG. 6 illustrates a block diagram of a flowchart according to an embodiment of the present invention. In particular, FIG. 6 illustrates an overview of the process of retrieving data stored in a disk memory of the streaming media cache as described in FIGS. 4A–D and forming a stream of streaming media data to a client system.

In this example, a client system requests streaming media from an embodiment of a streaming media cache, step 500. In one case, a request for streaming media may be made directly from a client system or via a proxy. Such a request is typically in the form of a URL, or the like. Additionally, the request may specify a presentation time T that represents the time where the playback should begin. Most requests set T equal to zero, however T is typically non-zero when the client system jumps around the media stream (e.g. makes a "seek" request).

If the client system does not terminate its connection with the streaming media cache, step 510, a determination is made as to whether to playback the streaming data or not, step 520. In embodiments of the present invention, other types of client events may be specified, such as disconnecting, a play request, a pause request, a stop request, a seek request, notification to the cache that while the client is receiving streaming data from the cache, that a future object is missing and needs to be prefetched, and the like.

In the present embodiment, if streaming data are to be streamed to the client system, the presentation time T is determined, step 530. Next, based upon the time T, the payload packet that includes data having the presentation time T is located, step 540. This step is typically performed in part by SMDISK 140. Next, the data are then formatted for the specific protocol and then sent to the client system, step 550. This step is typically performed in part by SMPACER 130 and protocol level 120. More detailed descriptions of the above steps is given below.

Figure 7:
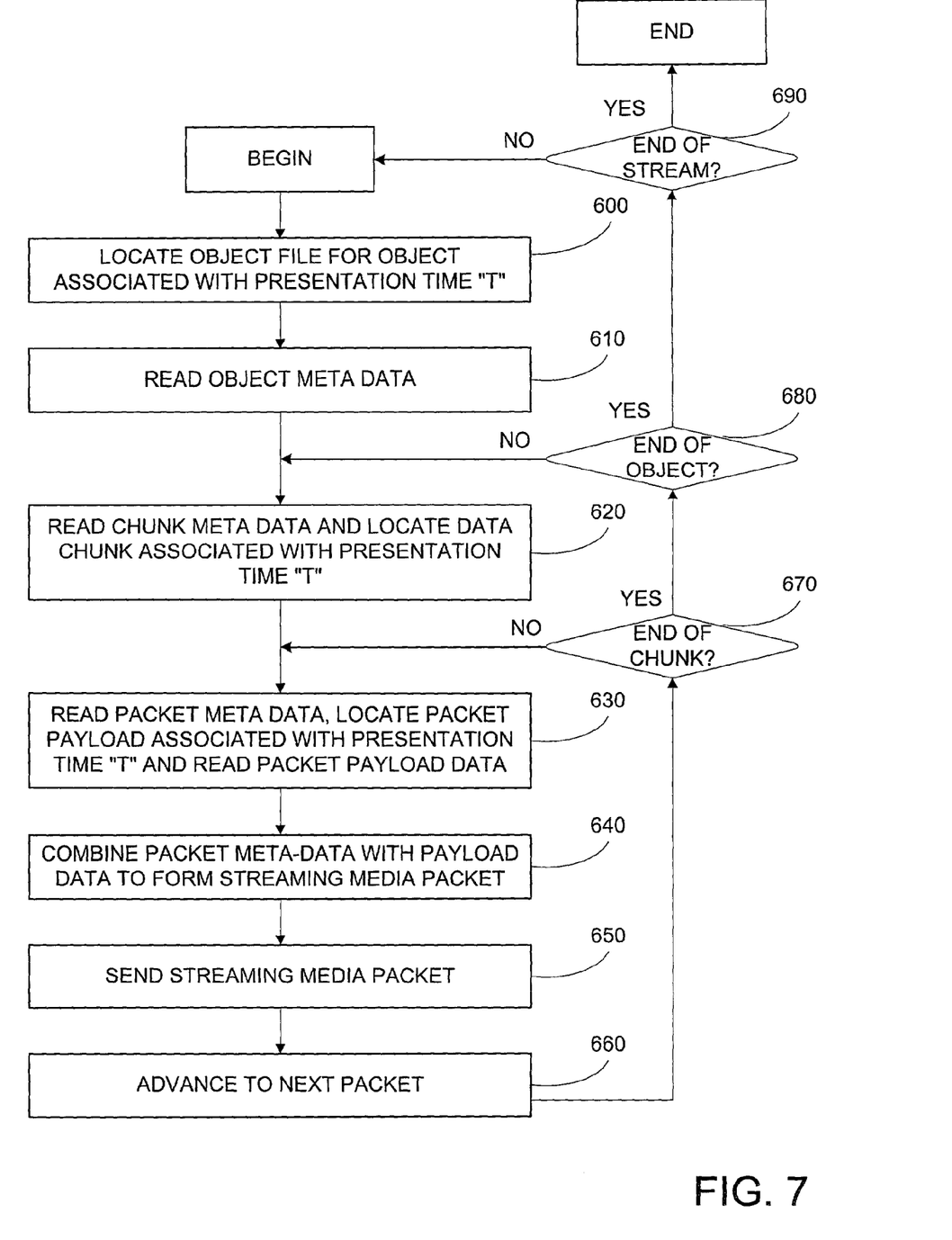
FIG. 7 illustrates a block diagram of a flowchart according to an embodiment of the present invention.

FIG. 7 illustrates a block diagram of a flowchart according to an embodiment of the present invention. In particular, FIG. 7 illustrates a more detailed process of locating and serving data.

In the present embodiment, in response to the presentation time T, the streaming media cache initially determines which data object to retrieve first, step 600. In the embodiment above, because an amount of time for each data object is fixed, for example at 10 seconds, the appropriate data object can easily be determined. For example, if the presentation time T were 5 minutes into a data stream, the appropriate data object would be the thirtieth one ((5 minutes x 60 seconds/minute)/10 seconds/data object 30). In one embodiment, the URL of the file, along with the presentation time T is first hashed, and the hash is then used to access the cache entry hash table illustrated in FIG. 4A. In another embodiment, a URL of the file, the type of encoding of the file, a validator for the file, and the time T is hashed, and the hash is used to access the cache entry hash table illustrated in FIG. 4A. In return, the cache entry hash table provides the appropriate file handle of the targeted data object.

Based upon the file handle, the object meta-data are first retrieved, step 610. The data are typically stored within RAM 90. Based upon the number of chunks of data within the target data object, the target data chunk is determined. In the present embodiment, the meta-data of the first data chunk in a data object is first retrieved and stored within RAM 90. This data also includes the packet meta-data for that data chunk. Then, using the chunk meta-data, by using the file offset meta-data, the target data chunk containing the desired packet payload (keyed by presentation time) is determined.

Next, the chunk meta-data of the target data chunk is retrieved, step 620. The chunk meta-data are stored within RAM 90 for access by processor 50. As described above, the chunk meta-data may specify the number of payload packets stored within the chunk. Next, based upon the number of payload packets within the data chunk, the target payload packet is determined. The packet meta-data of the target payload packet is then retrieved and stored within RAM 90 for access by processor 50, step 630.

In the present embodiment, packet match bits 270 are also retrieved, and if compressed, uncompressed. The packet match bits 270 are typically stored within RAM 90.

In the present embodiment, portions of the packet meta-data and the target payload packet are then combined, step 640. The resulting packet is sent to the client system, step 650. In embodiments of the present invention, the target payload packet is the same as what was received from the origin server. Further, the packet meta-data are typically protocol-specific header data, i.e. the data depends upon the type of stream provided, such as Quicktime, Windows Media, and the like. for example, the meta-data may include a per-client sequence number, packet timing information, and the like.

After this target payload packet is sent, this embodiment attempts to iterate to the next payload packet, step 660. If the target payload packet is the last one of the target data chunk, step 670, this embodiment attempts to iterate to the next data chunk. If the target data chunk is the last one of the target data object, step 680, this embodiment attempts to iterate to the next data object. If the target data object is the last one of the stream, step 690, the stream terminates.

In the above embodiment steps 600–630 are performed at least in part by SMDISK 140; step 640 is performed at least in part by SMPACER 130; and step 650 is performed at least in part by SMPACER 130. More specifically, SMDISK 140 typically retrieves packet meta-data and packet payloads from the cache memory (hard disk) and stores them into a memory buffer, such as buffer 97. SMDISK 140 then gives pointers to these buffer locations to SMPACER 130, and in turn SMPACER 130 gives the pointers to these buffer locations to protocol level 120. An encoding protocol in protocol level 120 processes the meta-data portion, and importantly, then simply appends the packet payload to form an encoded packet. This encoded packet is sent to SMPACER 130 for paced delivery to a client.

As illustrated above, packet payloads are simply stored and retrieved from the cache memory (hard disk) and no processing occurs on such data. The payload data are merely segmented into convenient-sized data chunks and data objects by SMDISK 140 and then stored in the cache memory. As discussed above, these data objects are individually accessible on a file level.

Advantages to embodiments of the present invention are believed to include that partial media streams can be saved within a cache. As disclosed above, as objects are populated, they are written to disk. Thus for example, when a first client system receives a data stream from a media server via the streaming media cache, the streaming media cache stores the data to disk. If the first client system terminates the stream half way through the stream, the streaming media cache stores half the stream. Later, the streaming media cache can serve the first half of the stream from cache.

Another advantage is that when the streaming media cache is full, it does not have to eject or flush an entire data stream, but can simply eject less frequently requested data objects. For example, the streaming media cache can eject the last 10 minutes of an hour long stream, while maintaining storage of the first 50 minutes. Thus, in contrast to conventional file level caching, embodiments of the present invention have an advantageous level of control over streaming media data. When additional space is required in the cache, seldom accessed portions of a data stream may thus be ejected freeing up space in the media cache for newer media data, or the like. In other embodiments, other indicia for determining when to flush portions of data streams may include upon number of requests for data, last request time for the data, based upon priority for data, and the like.

In view of the above disclosure, many other variations can be envisioned. For example, the data hierarchy can simply be modified according to engineering requirements. As an example, the granularity the data hierarchy can easily be changed and varied based upon experimental data, and the like. As another example, the sizes of the data structures may also be varied according to engineering requirements.

The invention has been described in embodiments above as a file cache or a streaming media cache. It should be understood, however, that, embodiments may be embodied in any computer system as a stand-alone system, or as part of another system. For example, one embodiment may be integrated into a computer system that includes web server software, database software, and the like. As another example, one embodiment may be distributed among a set of computer systems in a network, or the like. In similar examples, when there is a miss, embodiments of the present invention may access other embodiments in the network before attempting to access an origin server, or the like.

In other embodiments of the present invention, combinations or sub-combinations of the above-disclosed invention can be advantageously made. The block diagrams of the architecture and flowcharts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A cache memory device configured for media data streaming, the cache memory device comprising a memory and a processor configured to store in said memory:

a session data file configured to store properties of a media stream including media data, wherein the properties include one or both of: an encoding scheme of the media stream and a duration of the media stream;

a plurality of data object files, each data object file individually and directly accessible by a file system, each data object file comprising a data object configured to store a portion of the media data of the media stream;

wherein each of the plurality of data object files comprises a data object that comprises an object meta-data portion and a plurality of data chunks, wherein the object meta-data portion is configured to store a number representing a total number of data chunks in the plurality of data chunks, wherein each data chunk of the plurality data chunk is configured to store a subset of the portion the media data, wherein each data chunk comprises a chunk meta-data portion, a packet meta-data portion, and a plurality of packet payloads, wherein the chunk meta-data portion is configured to store a number representing a total number of packet payloads in the plurality of packet payloads, wherein the packet meta-data portion is configured to store a presentation time for each packet payload and wherein each of the plurality of packet payloads are configured to store only a portion of the subset of the portion of the media data.

2. The cache memory device of claim 1 wherein each data object has an associated presentation time.

3. The cache memory device of claim 2 wherein each data object has an associated duration time selected from the group:

approximately: 5 seconds, 10 seconds, 15 seconds, 20 seconds, 30 seconds, 1 minute.

4. The cache memory device of claim 1 wherein the object meta-data portion is also configured to store data representing one or more of: a file format version, a beginning presentation time, an ending presentation time, a file size.

5. The cache memory of claim 1 wherein the data chunk meta-data portion is also configured to store file offsets to adjacent data chunks in the plurality of data chunks.

6. A method for storing in a cache memory, media data to be output as streaming media, the method comprising:

storing a first plurality of data objects in the cache memory the first plurality of data objects configured to store a first plurality of data associated with a first encoding of media stream, wherein each data object of the first plurality of data objects is directly addressable in the cache memory via an associated object handle, and wherein each data object of the first plurality of data objects is configured to store a portion of data of the media stream; and storing a second plurality of data objects in the cache memory the second plurality of data objects configured to store a second plurality of data associated with a second encoding of the media stream, wherein each data object of the second plurality of data objects is directly addressable in the cache memory via an associated object handle, and wherein each data object of the second plurality of data objects is configured to store a portion of data of the media stream;

wherein a data object of the first plurality of data objects comprises an object meta-data portion and a plurality of data chunks, wherein the data object is configured to store a first portion of data from the first plurality of data, wherein the object meta-data portion is configured to store a number representing a total number of data chunks in the plurality of data chunks, wherein the plurality of data chunks are configured to store a subportion of data from the first portion of data, wherein a data chunk of the plurality of data chunks comprises a chunk meta-data portion, packet meta-data portion and a plurality of packet payloads, wherein the data chunk is configured to store a subportion of data from the portion of data, wherein the chunk meta-data are configured to store a number representing the total number of packet payloads in the plurality of packet payloads, wherein the packet meta-data portion is configured to store a presentation time for each packet payload, and wherein the plurality of packet payloads are configured to store a smaller subportion of data from the portion of data.

7. The method of claim 6 wherein the first encoding of the media stream and the second encoding of the media stream have a different encoding property from among: target stream bit rates, target stream bit depth, thinning parameters.

8. The method of claim 6 wherein the data chunk has a presentation time different from a presentation time for other data chunks in the plurality of data chunks.

9. The method of claim 8 wherein the smaller subportion of data has an associated duration of less than or equal to approximately a time selected from the group: 10 seconds, 30 seconds, 1 minute.

10. The method of claim 6 wherein the first portion of data are associated with a first logical segment of the media data.

11. A machine-readable storage medium for use in a processing system that includes a processor and a memory, the storage medium having stored thereon:

code that directs the processor to store a first plurality of data associated with an encoding of a first media stream in a first plurality of data objects in the memory, wherein each data object of the first plurality of data objects is addressable in the memory by the processor via an associated first object filename, and wherein each data object of the first plurality of data object is configured to store a portion of data from the media stream; and code that directs the processor to store a second plurality of data associated with an encoding of a second media stream in a second plurality of data abject in the memory, wherein each data object of the second plurality of data objects is addressable in the memory by the processor via an associated second object filename, and wherein each data object if the second plurality of data objects is configured to store a portion of data from the second media stream wherein a data object of the first plurality of data object comprises and object meta-data portion and a plurality of data chunks, wherein code that directs the processor to store a first plurality of data comprises:

code that directs the processor to store a subset of data from the portion of data from the first plurality of data into the plurality of data chunks; and code that directs the processor to store a number representing a total number of data chunks in the plurality of data chunks into the object meta-data portion, wherein a data chunk of the plurality of data chunks comprises a chunk meta-data portion, a packet meta-data portion, and a plurality of packet payloads, wherein code that directs the processor to store the subset of data comprises:

code that directs the processor to store a smaller subset of data from the portion of data from the first plurality of data into the plurality of packet payloads;

code that directs the processor to store a number representing a total number of packet payloads in the plurality of packet payloads into the chunk meta-data portion; and code that directs the processor to store a presentation time for each packet payload in the packet meta-data portion.

12. The machine-readable storage medium of claim 11 wherein the plurality of data chunks each have an associated duration of less than or equal to approximately a time selected from the group: 10 seconds, 30 seconds, 1 minute.

13. The machine-readable storage medium of claim 11 wherein the plurality of data chunks each have a size less than or equal to approximately a size selected from the group: 64 Kbytes, 128 Kbytes, 512 Kbytes, 1 Mbyte.

14. The machine-readable storage medium of claim 11 wherein a data object of the second plurality of data objects comprises an object meta-data portion and a plurality of data chunks, wherein a data chunk of the plurality of data chunks comprises a chunk meta-data portion, packet meta-data portion, and a plurality of packet payloads, and wherein code that directs the processor to store a second plurality of data comprises:

code that directs the processor to store a subset of data from the portion of data from the second plurality of data into the plurality of packet payloads;

code that directs the processor to store a number representing a total number of packet payloads in the plurality of packet payloads into the chunk meta-data portion;

code that directs the processor to store a presentation time for each packet payload into the packet meta-data portion; and code that directs the processor to store a number representing a total number of data chunks in the plurality of data chunks into the object meta-data portion.

15. A cache memory device configured to store streaming media data, the cache memory device comprising:

a processor;

a cache memory;

code that directs the processor to receive streaming media data of a media stream from a streaming media server, the streaming media data comprising a series of packets of media data of the media stream, the packets of the media data including header data and payload data of the media stream;

code that directs the processor to separate the header data from the payload date;

a session data file storing a portion of the header date, wherein the header data include one or both of: encoding scheme and duration; and a plurality of data objects storing the payload data, wherein each data object of the plurality of data objects is direct addressable in the cache memory via an associated object handle, and wherein each data object of the plurality of the data objects stores a portion of the payload data of the media stream;

wherein a data object from the plurality of data objects comprises an object meta-data portion and a plurality of data chunks, wherein the object meta-data portion stores a number representing a total number of data chunks in the plurality of data chunks, wherein each data chunk of the plurality of data chunks stores a subset of the portion of the payload data, wherein a data chunk of the plurality of data chunks comprises a chunk meta-data portion, packet meta-data portion and a plurality of packet payloads, wherein the chunk meta-data portion stores a number representing a total number of packet payloads in the plurality of packet payloads, wherein the packet meta-data portion is configured to store a presentation time for each packet payload, and wherein each of the plurality of packet payloads stores only a portion of the subset of the portion of the payload data.

16. The cache memory device of claim 15 wherein each data object is associated with a presentation time.

17. The cache memory device of claim 15 wherein the streaming media data are in a format selected from the group: Microsoft Media Streaming-compatible, Real Time Streaming Protocol-compatible, RealSystem-compatible, QuickTime-compatible.

18. The cache memory device of claim 15 wherein code that directs the processor to receive streaming media data from a streaming media server comprises code that directs a processor to receive streaming media data from the streaming media server on a port selected from the group: 554, 2001, 1755, 80.

19. The cache memory device of claim 15 wherein object handle comprises an object filename.

* * * * *